(12) United States Patent
Terry et al.

(10) Patent No.: US 7,181,176 B2
(45) Date of Patent: Feb. 20, 2007

(54) CLOSED LOOP TRANSMIT DIVERSITY OF POINT TO MULTIPOINT PHYSICAL CHANNELS

(75) Inventors: Stephen E. Terry, Northport, NY (US); Ariela Zeira, Huntington, NY (US)

(73) Assignee: InterDigital Technologies Corporation, Wilmington, DE (US)

( * ) Notice: Subject to any disclaimer, the term of this patent is extended or adjusted under 35 U.S.C. 154(b) by 490 days.

(21) Appl. No.: 10/637,023

(22) Filed: Aug. 7, 2003

(65) Prior Publication Data

US 2004/0097200 A1 May 20, 2004

Related U.S. Application Data

(60) Provisional application No. 60/402,199, filed on Aug. 7, 2002.

(51) Int. Cl.
H04B 1/02 (2006.01)
H04B 17/00 (2006.01)
H03C 1/52 (2006.01)
H04M 1/00 (2006.01)

(52) U.S. Cl. .................. 455/101; 455/108; 455/115.1; 455/561

(58) Field of Classification Search .............. 455/101, 455/103, 108, 115.1, 561, 562.1, 550.1, 553.1, 455/39, 73, 260, 352, 355
See application file for complete search history.

(56) References Cited

U.S. PATENT DOCUMENTS

| | | | |
|---|---|---|---|
| 5,812,935 A | 9/1998 | Kay | |
| 5,918,154 A | 6/1999 | Beasley | |
| 5,949,775 A | 9/1999 | Rautiola et al. | |
| 6,128,276 A * | 10/2000 | Agee | 370/208 |
| 6,128,355 A | 10/2000 | Backman | |
| 6,192,256 B1 | 2/2001 | Whinnett | |
| 6,259,891 B1 | 7/2001 | Allen | |
| 6,347,234 B1 * | 2/2002 | Scherzer | 455/562.1 |
| 6,463,295 B1 * | 10/2002 | Yun | 455/522 |
| 6,611,231 B2 * | 8/2003 | Crilly et al. | 342/378 |
| 6,907,272 B2 * | 6/2005 | Roy | 455/562.1 |
| 2001/0016477 A1 | 8/2001 | Harano | |
| 2002/0009156 A1 | 1/2002 | Hottinen et al. | |
| 2002/0018530 A1 | 2/2002 | Kim et al. | |
| 2002/0042290 A1 | 4/2002 | Williams et al. | |
| 2003/0003880 A1 * | 1/2003 | Ling et al. | 455/92 |
| 2003/0035491 A1 * | 2/2003 | Walton et al. | 375/267 |

FOREIGN PATENT DOCUMENTS

| | | |
|---|---|---|
| CN | 1237863 A | 12/1998 |
| KR | 2000-71105 | 11/2000 |
| KR | 2002-8301 | 1/2002 |

\* cited by examiner

Primary Examiner—Tony T. Nguyen
(74) Attorney, Agent, or Firm—Volpe and Koenig, P.C.

(57) ABSTRACT

Data is to be transmitted from one transmitting point to multiple reception points in a wireless communication system. A transmitting antenna array has multiple antenna elements at the one transmitting point. Channel information is measured for each antenna element at each reception point. Antenna adjustments are determined using the measured channel information. The measured channel information from all of the users is correlated to determine weighting factors for each antenna element. The weighting factors to a point to multiple point transmission are applied prior to being radiated by each antenna element.

2 Claims, 3 Drawing Sheets

CLOSED LOOP TRANSMIT DIVERSITY OF POINT TO MULTIPOINT PHYSICAL CHANNELS

CROSS REFERENCE TO RELATED APPLICATION(S)

Figure 1:
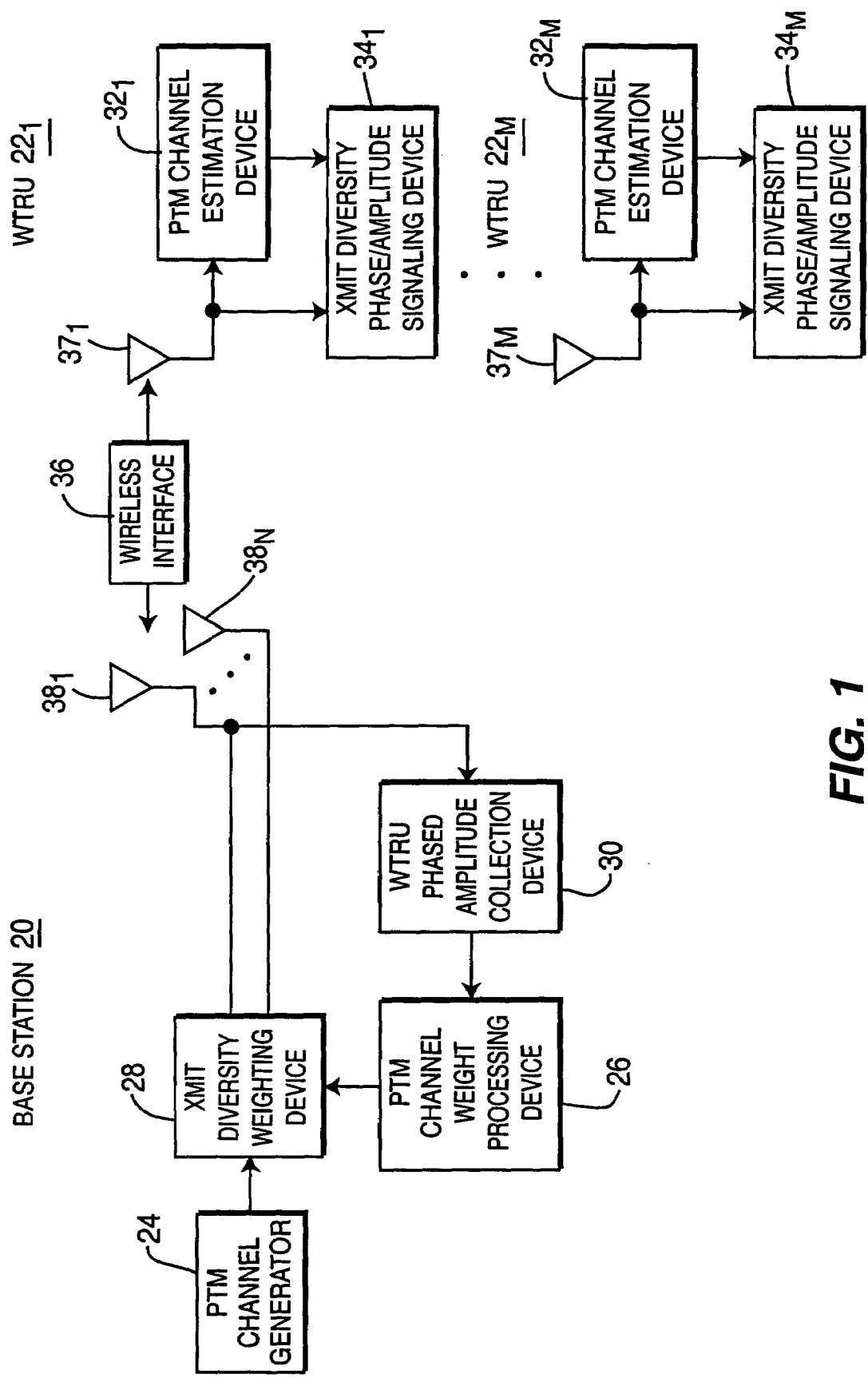

This application claims priority from U.S. provisional application No. 60/402,199, which was filed on Aug. 7, 2002, which is incorporated by reference as if fully set forth.

FIELD OF INVENTION

The present invention generally relates to wireless communication systems. In particular, the present invention relates to using transmit diversity to support point to multipoint channels in such systems.

BACKGROUND

There is a growing desire to use point to multi-point services in wireless communication systems. In a point to multi-point service, one transmission point sends service data to multiple reception points simultaneously. Examples of point to multi-point services are multimedia broadcasts and multicast services.

One concept commonly employed in wireless systems is transmit diversity. In transmit diversity, multiple antenna elements are used to transmit the same service signals. The phases and amplitudes of the signal transmitted by each antenna are adjusted so that the overall transmission is focused towards a desired receiver. Other receivers in the system receive lesser amounts or no transmission energy from that service transmission. For point to point services, transmit diversity can be utilized to isolate users and, accordingly, increase the overall radio resource efficiency.

Although transmit diversity can be used to more efficiently use radio resources, in point to multi-point communications applying transmit diversity is problematic. Users receiving the point to multi-point communication may be so geographically disbursed that transmit diversity may degrade the received signal quality of some users. Additionally, the phase and amplitude information from multiple users needs to be processed. The information from the multiple users may be conflicting and difficult to coordinate. However, in certain situations, transmit diversity techniques could provide better radio resource utilization.

Accordingly, it is desirable to have techniques for using transmit diversity with point to multi-point services.

SUMMARY

Data is to be transmitted from one transmitting point to multiple reception points in a wireless communication system. A transmitting antenna array has multiple antenna elements at the one transmitting point. Channel information is measured for each antenna element at each reception point. Antenna adjustments are determined using the measured channel information. The measured channel information from all of the users is correlated to determine weighting factors for each antenna element. The weighting factors to a point to multiple point transmission are applied prior to being radiated by each antenna element.

BRIEF DESCRIPTION OF THE DRAWING(S)

Figure 2:
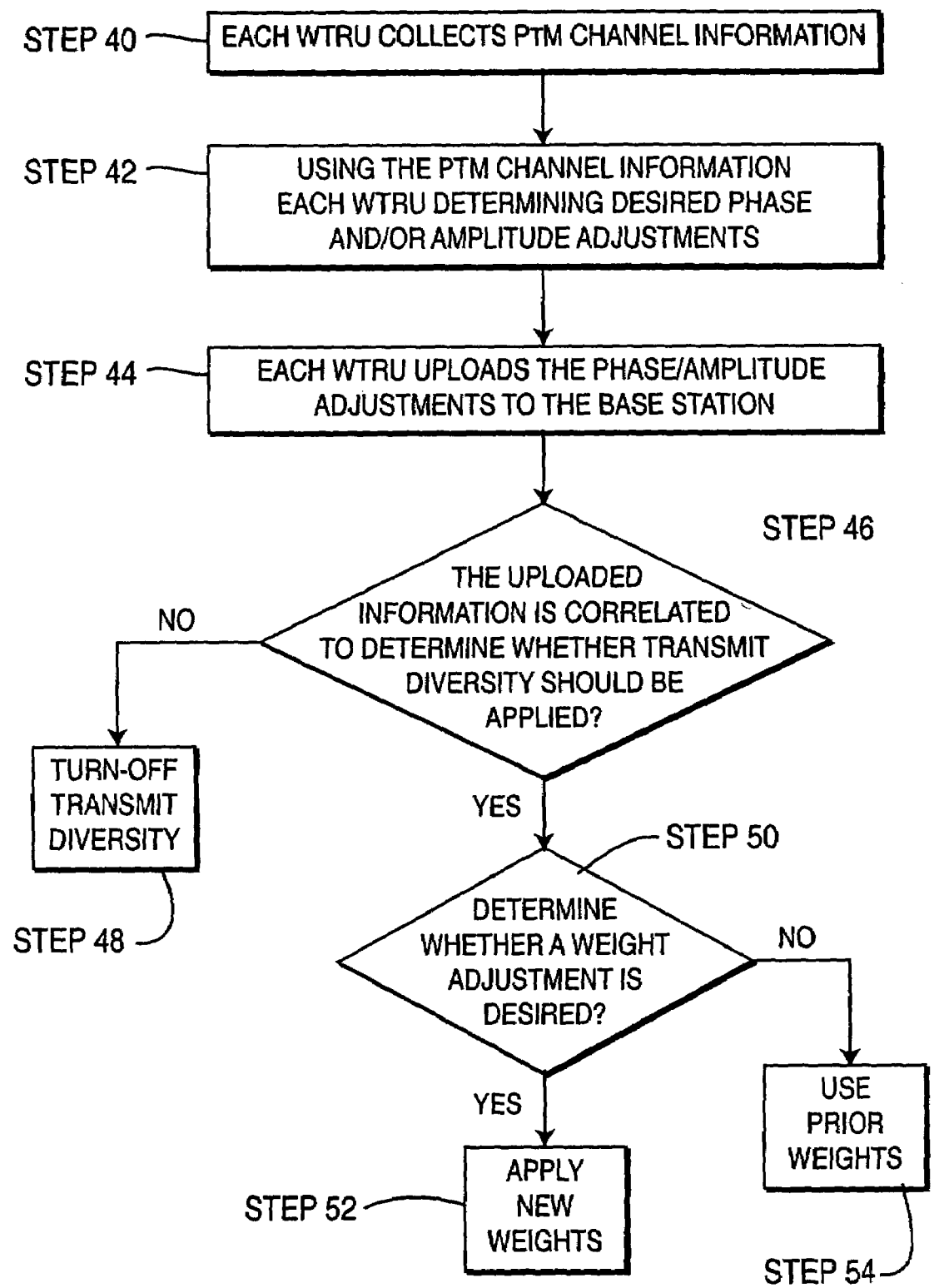
Figure 3:
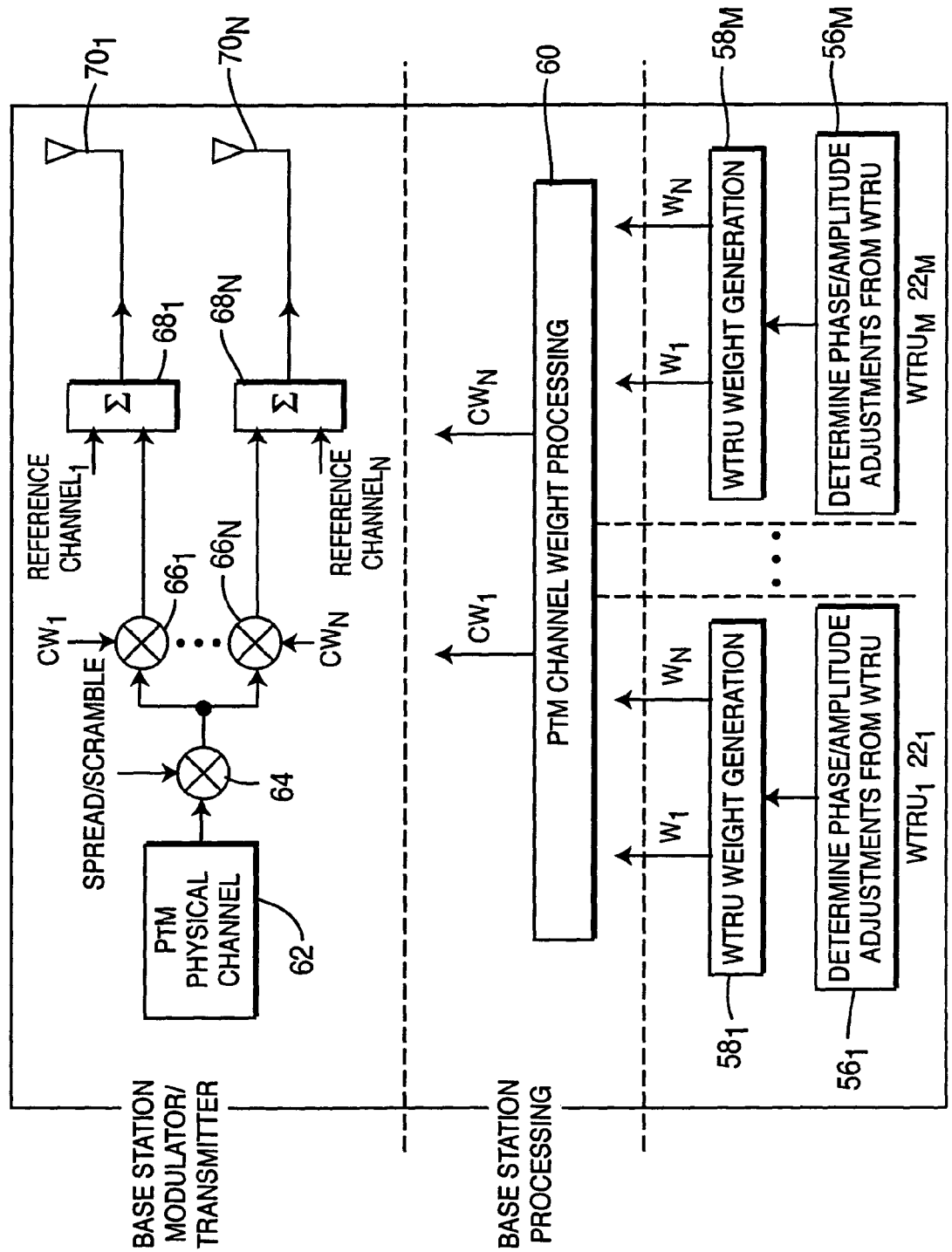

FIG. 1 is a simplified diagram of a point to multi-point base station and WTRU employing transmit diversity.
FIG. 2 is a flow chart for selective transmit diversity.
FIG. 3 is the processing flow for an implementation of PtM transmit diversity.

DETAILED DESCRIPTION OF THE PREFERRED EMBODIMENT(S)

Although the preferred embodiments are described in conjunction with a third generation partnership program (3GPP) wideband code division multiple access (W-CDMA) system, the embodiments are applicable to any wireless system using point to multi-point transmissions. Hereafter, a wireless transmit/receive unit (WTRU) includes but is not limited to a user equipment, mobile station, fixed or mobile subscriber unit, pager, or any other type of device capable of operating in a wireless environment.

FIG. 1 is a simplified diagram of a base station 20 and a group of WTRUs $22_1$ to $22_M$ (22) receiving a point to multi-point (PtM) service using transmit or selective transmit diversity. The PtM channel is generated, such as by a PtM channel generator device 24. When transmit diversity is being applied to the PtM channel, a transmit (XMIT) diversity weighting device 28 weights a version of the PtM channel signal to be radiated by each antenna element $38_1$ to $38_N$ (38) of the base station transmitting array.

After the PtM channel signals pass through the wireless interface, each WTRU 22 receives a composite PtM channel signal, such as by using an antenna $37_1$ to $37_M$. A PtM channel estimation device $32_1$ to $32_M$ (32) estimates the channel response of each transmitted version of the PtM channel signal. The channel response information is provided to a transmit (XMIT) diversity phase/amplitude signaling device $34_1$ to $34_M$ (34). The transmit diversity phase/amplitude signaling device 34 determines desired phase/amplitude adjustments for the transmitting array 38 to allow for better reception of the PtM signal by that WTRU 22. The transmit diversity phase/amplitude device 34 signals this information to the base station 20, such as by a layer 1 signal using a dedicated uplink physical channel or a layer 2/3 message. Typically, the period between the channel estimation measurement in the WTRU 22 and reception of signaled information in the base station is known between the WTRU 22 and base station 20.

At the base station 20, a WTRU phase/amplitude collection device 30 collects the signaled phase/amplitude information from all WTRUs associated with each PtM service. Typically, each PtM service is treated separately for transmit diversity analysis. A PtM channel weighting device 26 uses the accumulated phase/amplitude information to adjust the weights of the transmit diversity weighting device 28. The PtM channel weighting device 28 may also decide to turn transmit diversity on and off on a radio frame or TTI basis.

Preferably, the PtM channel weighting device 28 determines a composite weight vector to be applied to the antenna elements 38. If the link performance for each WTRU 22 of the PtM service is no worse than the link performance when transmit diversity is not used, the weight vector is applied to the PtM. If any user will suffer a degradation in link performance using the weight vector, transmit diversity is not applied.

In the preferred embodiment, transmit diversity for point to multi-point (PtM) transmissions is selectively applied, although other techniques may be used. In general, when a high degree of correlation (similarity between measurements) exist between the received WTRU phase/amplitude information, adjustment are made to the transmit diversity weighting vector. When less correlation exists, either transmit diversity is turned off or no change is made to the weighting vector.

FIG. 2 is a flow chart for selectively applying transmit diversity. Each WTRU 22 receiving the PtM service collects PtM readings, such as by performing a channel estimation on the PtM service, step 40. Using the collected PtM information, the WTRU 22 determines desired phase and/or amplitude adjustments to improve its reception of the PtM, step 42. The WTRUs 22 upload this information to the base station, such as by layer one signaling on an uplink dedicated physical control channel or by layer ⅔ signaling, step 44. The uploaded information, such as feedback information (FBI) bits, in the preferred embodiment are antenna weight values determined by the WTRU 22, although other forms of uploaded information may be used. The base station correlates the uploaded information from all the WTRUs.

The correlated uploaded information is analyzed to determine whether a transmit diversity scheme should be employed, step 46. If a scheme should not be employed, transmit diversity is turned-off, step 48. If the transmit diversity scheme should be employed, a determination is made whether a weight adjustment to the transmitting antenna elements is desired, step 50. If the weights should be adjusted, the new weights are applied to the array 38, step 54. If the weights should not be adjusted, the prior weighting should be maintained, step 52.

One approach to analyze the uploading information is a threshold range test. The correlated weight value is compared to a threshold range. If the correlated weight value is below the range, transmit diversity is disabled. If the correlated weight value is within the range, no adjustment is made. If the correlated weight value is above the range, an average weight adjustment is applied.

FIG. 3 is an illustration of an implementation of the processing performed for PtM transmit diversity. Each WTRU 22 in the PtM service group, determines phase/amplitude adjustments that it desires be made at the base station transmitting array, $56_1$ to $56_M$. The WTRU 22 determines weight factors for each antenna element $70_1$ to $70_N$ (70) of the array, $58_1$ to $58_M$. The base station 20 receives and processes all the WTRU's weight factors and produces channel weight values for each antenna element 70, 60. For the PtM modulator/transmitting circuitry, the PtM service data is produced by a PtM channel generator 62. The PtM channel data, for the preferred 3GPP W-CDMA system, is mixed with a spreading and scrambling code using a mixer 64.

The spread and scrambled PtM channel is processed by a weighting device $66_1$ to $66_N$ (66) for each antenna element 70. The determined channel weight values for each antenna are applied to the spread and scrambled PtM channel by the weighting devices 66. Each weighted antenna signal is preferably combined with a reference channel signal to facilitate channel estimation at the WTRUs by a combiner $68_1$ to $68_N$ (68). Each WTRU 22 can use the reference channel signal sent from an antenna 70 to estimate the channel response associated with that antenna 70. Each combined channel signal is radiated to the WTRUs 22 using its corresponding antenna element 70.

What is claimed is:

1. A wireless transmit/receive unit (WTRU) comprising:
   a point to multi-point channel estimation device for determining a channel response for each transmitted version of a point to multi-point transmission, each transmitted version originating from a different transmitting antenna element and the point to multi-point channel being sent to multiple WTRUs simultaneously, the point to multi-point transmission being sent using transmit diversity using weight values from multiple WTRUs; and
   a transmit diversity phase/amplitude signaling device for determining weight values representing phase/amplitude values for each transmitting antenna and signaling the determined weights and determining whether a link quality when transmit diversity is applied is equal to or better than when transmit diversity is not applied and whereby transmit diversity is not applied when any of the multiple WTRUs does not have an equal to or better than link quality when transmit diversity is applied.

2. A wireless transmit/receive unit (WTRU) comprising:
   means for determining a channel response for each transmitted version of a point to multi-point transmission, each transmitted version originating from a different transmitting antenna element and the point to multi-point channel being sent to multiple WTRUs simultaneously, the point to multi-point transmission being sent using transmit diversity using weight values from multiple WTRUs; and
   means for determining weight values representing phase/amplitude values for each transmitting antenna and signaling the determined weights and determining whether a link quality when transmit diversity is applied is equal to or better than when transmit diversity is not applied and whereby transmit diversity is not applied when any of the multiple WTRUs does not have an equal to or better than link quality when transmit diversity is applied.

* * * * *

UNITED STATES PATENT AND TRADEMARK OFFICE
CERTIFICATE OF CORRECTION

PATENT NO. : 7,181,176 B2  
APPLICATION NO. : 10/637023  
DATED : February 20, 2007  
INVENTOR(S) : Terry et al.

Page 1 of 1

It is certified that error appears in the above-identified patent and that said Letters Patent is hereby corrected as shown below:

ON THE TITLE PAGE

At section (73), Assignee, page 1, left column, line 1, after "(73) Assignee:", delete "InterDigital Technologies" and insert therefor --InterDigital Technology--.

IN THE DRAWINGS

At sheet 2, FIG. 2, at STEP 42, line 2, after "WTRU", delete "DETERMINING" and insert therefor --DETERMINES--.

IN THE SPECIFICATION

At column 3, line 2, before the word "between", delete "exist".

At column 3, line 3, before the words "are made", delete "adjustment" and insert therefor --adjustments--.

IN THE CLAIMS

At claim 1, column 4, line 31, after "WTRUs", delete "does" and insert therefor --do--.

At claim 2, column 4, line 48, after "WTRUs", delete "does" and insert therefor --do--.

Signed and Sealed this

Twenty-seventh Day of January, 2009

JOHN DOLL  
*Acting Director of the United States Patent and Trademark Office*